US005824759A

United States Patent [19]

Watanabe et al.

[11] Patent Number: 5,824,759

[45] Date of Patent: Oct. 20, 1998

[54] PROPYLENE RESIN COMPOSITION AND MOLDED ARTICLE THEREOF

[75] Inventors: Kazuyuki Watanabe; Sakuyoshi Nakagami; Meiko Saihata, all of Oita, Japan

[73] Assignee: Showa Denko K.K., Tokyo, Japan

[21] Appl. No.: 716,405

[22] PCT Filed: Jan. 18, 1996

[86] PCT No.: PCT/JP96/00063

§ 371 Date: Nov. 1, 1996

§ 102(e) Date: Nov. 1, 1996

[87] PCT Pub. No.: WO96/23029

PCT Pub. Date: Aug. 1, 1996

[30] Foreign Application Priority Data

| | | | |
|---|---|---|---|
| Jan. 23, 1995 | [JP] | Japan | 7-008509 |
| Feb. 2, 1995 | [JP] | Japan | 7-016215 |
| Feb. 2, 1995 | [JP] | Japan | 7-016217 |

[51] Int. Cl.[6] .......... C08F 210/00

[52] U.S. Cl. .......... 526/348; 525/273; 525/321; 525/333.8; 525/387

[58] Field of Search .......... 526/348; 525/321, 525/273, 387, 333.8

[56] References Cited

FOREIGN PATENT DOCUMENTS

| | | |
|---|---|---|
| 48-21731 | 3/1973 | Japan . |
| 52-37953 | 3/1977 | Japan . |
| 61-136546 | 6/1986 | Japan . |
| 62-235352 | 10/1987 | Japan . |
| 2-80218 | 3/1990 | Japan . |
| 4-73112 | 3/1992 | Japan . |
| 4-73142 | 3/1992 | Japan . |
| 5-306358 | 11/1993 | Japan . |

*Primary Examiner*—Edward J. Cain
*Attorney, Agent, or Firm*—Armstrong, Westerman, Hattori, McLeland & Naughton

[57] ABSTRACT

A propylene resin composition obtained by dynamic heat treatment of a blend of (A) 100 parts by weight of a propylene-α-olefin block copolymer wherein a ratio ($\eta_1/\eta_2$) of melt viscosity $\eta_1$ at a shear rate of $10^1$ $sec^{-1}$ to melt viscosity $\eta_2$ at a shear rate of $10^2$ $sec^{-1}$ is 3.5 to 8 as measured by a slit die method and (B)0.005 to 2 parts by weight of an organic peroxide, and having a melt flow rate (measured according to JIS K7210, at a temperature of 230° C. under a load of 2.16 kg) adjusted to 50 to 300 g/10 minutes, a main endothermic peak temperature Tmp of 120° to 150° C. for melting temperature and a main exothermic peak temperature Tcp of 85° to 105° C. for crystallization temperature, as measured with a Differential Scanning Calorimetry, and a Tcp half-value width of 5° C. or above, and a molded article obtained by using the same.

17 Claims, 2 Drawing Sheets

S: METHYLENE
T: METHINE
P: METHYL

PROPYLENE RESIN COMPOSITION AND MOLDED ARTICLE THEREOF

TECHNICAL FIELD

The present invention relates to a propylene resin composition with excellent low-temperature flowability, stampable moldability, peeling strength and embossing ability, which is suitably used in the fields of interior materials including, particularly, automobile parts, electrical and electronic parts, ships, wheeled vehicles, buildings, etc., and to a molded article obtained by using the same.

BACKGROUND ART

Hot stampable molding methods are used to obtain molded articles by directly stamping semi-melt sheets which have been extruded from a die of a sheet molding machine, and they are also applied to laminates. Such molding methods are also advantageous from a cost viewpoint since they do not require reheating of once-solidified master sheets, as has been required in conventional molding methods, and such molding methods have therefore been attractive in recent years. As resins suited for this molding method there have been proposed, for example, a propylene resin having a high flowability (Japanese Patent laid-open No.2-80218, etc.) and an olefin thermoplastic elastomers (Japanese Patent laid-open No. 4-73112, No.4-73142, etc.).

However, since all of the above-mentioned resins have a high crystallization rate, they begin to solidify immediately after extrusion from a die and thus provide insufficient flowability. Therefore, it has not been considered that they are suitable for hot stampable molding. The flexibility of the molded article being obtained thus is also inferior. In order to improve it and impart a high flowability, for example, it has been proposed to add 50% by weight of oil, but it has caused the problem of bleed-out of oil from the surface of the molded article, thus notably impairing appearance thereof.

Further, as a result of research, the present inventors found that when visbreaking treatment was conducted using an organic peroxide for the above-mentioned olefin thermoplastic elastomers to impart a high flowability, new problems occurred that the rubber component became crosslinked, forming gel fish-eyes and a nonuniform flowability, and thus resulting in an inferior appearance and a low mechanical strength of the molded article. Also in laminates, another problem occurred that when the above-mentioned resin was used, an adhesive strength for a substrate was low.

Furthermore, such laminates are often subjected to unevenness treatment, i.e., so-called "embossing" for a surface thereof in order to provide the impression of high quality, but the problem occurred that embossing ability was inferior in the above-mentioned resin.

DISCLOSURE OF THE INVENTION

In light of these circumstances, an object of the present invention is to provide a propylene resin composition with a high crystallization rate, excellent low-temperature flowability, flexibility and stampable moldability, and a favorable appearance and a mechanical strength (particularly, tensile elongation), and a molded article using the same, and particularly a multilayered laminate using the above-mentioned composition having superior peeling strength and superior embossing ability.

As a result of extensive study, the present inventors have found that the above-mentioned object can be attained by using a propylene-α-olefin block copolymer having particular properties, and established the present invention bases on this finding.

That is, the present invention provides a propylene resin composition obtained by dynamic heat treatment of a blend of (A) 100 parts by weight of a propylene-α-olefin block copolymer wherein a ratio ($\eta_1/\eta_2$) of melt viscosity $\eta_1$ at a shear rate of $10^1$ $sec^{-1}$ to melt viscosity 72 $_2$ at a shear rate of $10^2$ $sec^{-1}$ is 3.5 to 8 as measured by a slit die method and (B) 0.005 to 2 parts by weight of an organic peroxide, and having a melt flow rate (measured according to JIS K7210, at a temperature of 230° C. under a load of 2.16 kg) adjusted to 50 to 300 g/10 minutes, a main endothermic peak temperature Tmp of 120° to 150° C. for melting temperature and a main exothermic peak temperature Tcp of 85° to 105° C. for crystallization temperature, as measured with a Differential Scanning Calorimetry, and a Tcp half-value width of 5° C. or above, and a stamping molding article obtained by molding the above-mentioned propylene resin composition.

The present invention also provides a propylene resin composition obtained by dynamic heat treatment of a blend of (A) 100 parts by weight of a propylene-α-olefin block copolymer wherein a ratio ($\eta_1/\eta_2$) of melt viscosity $\eta_1$ at a shear rate of $10^1$ $sec^{-1}$ to melt viscosity $\eta_2$ at a shear rate of $10^2$ $sec^{-1}$ is 3.5 to 8 as measured by a slit die method, (B) 0.005 to 2 parts by weight of an organic peroxide, and (C) 1 to 30 parts by weight of at least one plasticizer selected from the group consisting of mineral oil softeners, phthalate plasticizers and silicone oils, and having a melt flow rate (measured according to JIS K7210, at a temperature of 230° C. under a load of 2.16 kg) adjusted to 50 to 300 g/10 minutes, and a stamping molding article obtained by molding the above-mentioned propylene resin composition.

The present invention further provides a propylene resin composition obtained by dynamic heat treatment of a blend of (A) 100 parts by weight of a propylene-α-olefin block copolymer wherein a ratio ($\eta_1/\eta_2$) of melt viscosity $\eta_1$ at a shear rate of $10^1$ $sec^{-1}$ to melt viscosity $\eta_2$ at a shear rate of $10^2$ $sec^{-1}$ is 3.5 to 8 as measured by a slit die method, (B) 0.005 to 2 parts by weight of an organic peroxide, and (D) 5 to 150 parts by weight of a rubbery polymer, and having a melt flow rate (measured according to JIS K7210, at a temperature of 230° C. under a load of 2.16 kg) adjusted to 50 to 300 g/10 minutes, a main endothermic peak temperature Tmp of 120° to 150° C. for melting temperature and a main exothermic peak temperature Tcp of 85° to 105° C. for crystallization temperature, as measured with a Differential Scanning calorimetry, and a Tcp half-value width of 5° C. or above, and a molded sheet obtained by molding the above-mentioned propylene resin composition.

The present invention further provides a propylene resin composition comprising a mixture of 5 to 150 parts by weight of the above-mentioned component (D) with a treated mixture obtained by dynamic heat treatment of a blend of 100 parts by weight of the above-mentioned component (A) and 0.005 to 2 parts by weight of the above-mentioned component (B), and having a melt flow rate (measured according to JIS K7210, at a temperature of 230° C. under a load of 2.16 kg) adjusted to 50 to 300 g/10 minutes, a main endothermic peak temperature Tmp of 120° to 150° C. for melting temperature and a main exothermic peak temperature Tcp of 85° to 105° C. for crystallization temperature, as measured with a Differential Scanning Calorimetry, and a Tcp half-value width of 5° C. or above.

The present invention further provides a propylene resin composition obtained by adding other components to a treated mixture which is a blend of (A) 100 parts by weight of a propylene-α-olefin block copolymer wherein a ratio ($\eta_1/\eta_2$) of melt viscosity $\eta_1$ at a shear rate of $10^1$ $sec^{-1}$ and melt viscosity $\eta_2$ at a shear rate of $10^2$ $sec^{-1}$ is 3.5 to 8 as measured by a slit die method, (B) 0.005 to 2 parts by weight of an organic peroxide, (C) 1 to 30 parts by weight of at least one plasticizer selected from the group consisting of mineral oil softeners, phthalate plasticizers and silicone oils, and (D) 5 to 150 parts by weight of a rubbery polymer, wherein at least component (A) and component (B) among components (A) to (D) have been subjected to dynamic heat treatment in advance), and having a Melt flow rate (measured according to JIS K7210, at a temperature of 230° C. under a load of 2.16 kg) adjusted to 50 to 300 g/10 minutes, and a molded sheet obtained by molding the propylene resin composition.

The present invention further provides a multilayered laminate which comprises at least two layers of a layer (I) being composed of a propylene resin composition obtained by dynamic heat treatment of a blend of (A) 100 parts by weight of a propylene-α-olefin block copolymer wherein a ratio ($\eta_1/\eta_2$) of melt viscosity $\eta_1$ at a shear rate of $10^1$ $sec^{-1}$ and melt viscosity $\eta_2$ at a shear rate of $10^2$ $sec^{-1}$ is 3.5 to 8 as measured by a slit die method, and (B) 0.005 to 2 parts by weight of an organic peroxide, and having a melt flow rate (measured according to JIS K7210, at a temperature of 230° C. under a load of 2.16 kg) adjusted to 50 to 300 g/10 minutes, and a substrate layer (II), or at least 2 layers of the above-mentioned layer (I) and a foam layer (III).

The present invention further provides a multilayered laminate which comprises at least two layers of layer (I) being composed of a propylene resin composition obtained by dynamic heat treatment of a blend of 100 parts by weight of the above-mentioned component (A), 0.005 to 2 parts by weight of the above-mentioned component (B), and 1 to 30 parts by weight of (C) at least one plasticizer selected from the group consisting of mineral oil softeners, phthalate plasticizers and silicone oils, and having a melt flow rate adjusted to 50 to 300 g/10 minutes, and a substrate layer (II), or at least 2 layers of the above-mentioned layer (I) and a foam layer (III).

The present invention further provides a multilayered laminate which comprises at least two layers of a layer (I) being composed of a propylene resin composition obtained by dynamic heat treatment of a blend of (A) 100 parts by weight of a propylene-α-olefin block copolymer wherein a ratio ($\eta_1/\eta_2$) of melt viscosity $\eta_1$ at a shear rate of $10^1$ $sec^{-1}$ and melt viscosity $\eta_2$ at a shear rate of $10^2$ $sec^{-1}$ is 3.5 to 8 as measured by a slit die method, (B) 0.005 to 2 parts by weight of an organic peroxide, and (D) 5 to 150 parts by weight of a rubbery polymer, and having a melt flow rate (measured according to JIS K7210, at a temperature of 230° C. under a load of 2.16 kg) adjusted to 50 to 300 g/10 minutes, and a substrate layer (II), or at least 2 layers of the above-mentioned layer (I) and a foam layer (III).

The present invention further provides a multilayerd laminate which comprises at least 2 layers of a layer (I) being composed of a propylene resin composition obtained by dynamic heat treatment of a blend of 100 parts by weight of the above-mentioned component (A), 0.005 to 2 parts by weight of the above-mentioned component (B), 1 to 30 parts by weight of (C) at least one plasticizer selected from the group consisting of mineral oil softeners, phthalate plasticizers and silicone oils and 5 to 150 parts by weight of component (D), and having a melt flow rate adjusted to 50 to 300 g/10 minutes, and a substrate layer (II), or at least 2 layers of the above-mentioned layer (I) and a foam layer (III).

The present invention also has the following preferred embodiments.

That is, component (A) preferably comprises a polypropylene block and a copolymer block of propylene and an α-olefin of 2 to 12 carbon atoms (except 3), and the percent of the copolymer block to the total copolymer preferably is 30 to 70% by weight.

Further, component (A) preferably also has the following properties (a) and (b).

(a) The p-xylene-insoluble matter at 25 is 25 to 65% by weight.

(b) The p-xylene-soluble matter at 25° C. has (i) an average propylene content (FP) of 20 to 80 mole % based on 2-site model, (ii) a propylene content ($P_P$) of 65 to 90 mole % in a copolymer ($P_H$) which is produced at an active point at which propylene preferentially is polymerized, based on 2-site model, and (iii) a proportion ($P_{f1}$) of $P_H$ to the copolymer of 0.40 to 0.90.

The present invention will now be explained in more detail.

The propylene-α-olefin block copolymer (A) (hereinafter, referred to as "BPP") being used according to the invention is a block copolymer comprising a polypropylene block and a copolymer block of propylene and other α-olefins.

Preferred examples of BPP according to the invention include block copolymers comprising a polypropylene block and a copolymer block of propylene and an α-olefin of 1 to 12 carbon atoms (except 3). Examples of α-olefin include ethylene, 1-butene, 3-methyl-1-butene, 3-methyl-1-pentene, 4-methyl-1-pentene, 4-dimethyl-1-pentene, vinylcyclopentane, vinylcyclohexane, and the like. The α-olefins may be used alone or in a mixture of 2 or more.

The proportion of the copolymerized rubber block to the total copolymer is generally 30 to 70% by weight (hereinafter, referred to as "wt %"), and more preferably 35 to 68 wt %, and particularly suitably 40 to 65 wt %.

In the BPP of the present invention, it is necessary that the ratio ($\eta_1/\eta_2$) of melt viscosity $\eta_1$ at a shear rate of $10^1$ $sec^{-1}$ to melt viscosity $\eta_2$ at a shear rate of $10^2$ $sec^{-1}$ as measured by a slit die method is 3.5 to 8. The melt viscosity ratio (72 $_1/\eta_2$) is preferably 4.0 to 7.5, and particularly suitably 4.5 to 7.0. When the melt viscosity ratio is below 3.5, draw down will be large, resulting in poor sheet moldability, whereas above 8 it is unpreferable since stampable moldability deteriorates.

The slit die measurement method is a method of measuring a melt viscosity at a temperature of 170° C. using a slit die with 20 mm width, 1.5 mm height and 60 mm length. This method is described in more detail in C. D. Han; Rheology in Polymer Processing, Academic, New York (1976) and J. L. White; Principles of Polymer Engineering Rheology, John Wiley, New York (1990).

Specifically, the measurement is performed using a commercially available viscometer with a slit die (Labo Plastomill Model D20-20, made by Toyo Precision Instruments Laboratories).

As BPP having excellent stampable sheet moldability, it is preferred that BPP has the following properties (a) and (b).

That is, (a) p-xylene-insoluble matter at 25° C. is 25 to 65 wt % , and (b) p-xylene-soluble matter at 25° C. has (i) an average propylene content (FP) of 20 to 80 mole % based on 2-site model, (ii) a propylene content ($P_P$) of 65 to 90 mole % in a copolymer ($P_H$) which is produced at an active point at which propylene is preferentially polymerized, based on 2-site model, and (iii) a proportion ($P_{f1}$) of $P_H$ in the copolymer in a range of 0.40 to 0.90.

The (a) p-xylene-insoluble matter is an insoluble matter when about 1 wt % of BPP is dissolved in p-xylene at a temperature of 130° C. and then cooled to 25° C., and the BPP content according to the present invention is preferably 25 to 65 wt %, and particularly suitabley 30 to 60 wt %. The (b) p-xylene-soluble matter is dissolved components when dissolved according to the above-mentioned procedure, and the properties determined according to the 2-site model are preferably within the ranges specified above.

The 2-site model of propylene-α-olefin will now be explained using the example of propylene-ethylene copolymer. FIG. 1 shows a carbon isotope nuclear magnetic resonance spectrum ($^{13}$C-NMR) for propylene-ethylene copolymer. In the spectrum, 10 peaks indicated as (1) to (10) appear depending on the differences in the chain distribution (sequence of ethylene and propylene). The designations of the chains are found in Carman, C. J., et al; Macromolecules, Vol.10, p.536–544 (1977), and are shown in FIG. 2. The chains may be expressed in terms of reaction probability (P) assuming a copolymerization reaction mechanism, and the relative intensity of each peak of (1) to (10) when the peak intensity of the whole is defined as 1 may be expressed as a Bernoulli statistical probability equation with P as a parameter.

For example, in the case of (1) Sαα, when propylene unit is represented by symbol "p" and ethylene unit by symbol "e", possible chains are the 3 types of [pppp], [pppe] and [eppe], and they are expressed as reaction probability (P), respectively and added together. Equations are made up in the same manner for the remaining peaks of (2) to (10), and P is optimized so that the 10 equations are closest to the actually measured peak intensities.

The 2-site model assumes this reaction mechanism, and it is described in H. N. CHENG; Journal of Applied Polymer Science, Vol.35, p.1639–1650 (1988). That is, in the model of copolymerization of propylene and ethylene using a catalyst, assuming both a propylene content ($P_P$) of a copolymer ($P_H$) being produced at an active point at which propylene is preferentially polymerized and a propylene content ($P'_P$) of a copolymer being produced at an active point at which ethylene is preferentially polymerized, the proportion ($P_{f1}$) of $P_H$ in the copolymer being used as a parameter, the probability equation shown in Table 1 is obtained.

Thus, the 3 parameters of $P_P$, $P'_P$, and $P_{f1}$ are optimized so that the relative intensities of the mentioned-above $^{13}$C-NMR spectrum accord with the probability equations in Table 1.

The average propylene content (FP) of the (i) p-xylene-soluble matter of BPP of the present invention is determined from the following equation using the above-mentioned 3 parameters.

$$FP=P_P\times P_{f1}+P'_P\times(1-P_{f1})\ (\text{mole }\%)$$

FP determined from this equation is preferably 20 to 80 mole %, and more preferably 30 to 70 mole %.

Furthermore, the parameter (ii) $P_P$ is preferably 65 to 90 mole %, and particularly suitably 70 to 80 mole.

Moreover, (iii) $P_{f1}$ is preferably 0.40 to 0.90, and particularly suitably 0.48 to 0.82.

The polymerization of BPP of the present invention is carried out by a slurry method in the presence of an inert hydrocarbon such as hexane, heptane, kerosene, etc., or a liquefied α-olefin solvent such as propylene, or by a gas-phase method in the absence of a solvent, at a temperature of from room temperature to 130° C., preferably 50° to 90° C., under a pressure of 2 to 50 kg/cm$^2$. The reactor used for the polymerization step may be one which is conventionally used in the field of the art, e.g., a stirring bath type reactor, a fluidized bed type reactor or circulation type reactor and a continuous process, semi-batch process and batch process may be applied. Specifically, it may be obtained using a known multistage polymerization process. This is a method in which propylene and/or propylene-α-olefin copolymer are polymerized in a first-stage reaction, and then the propylene and α-olefin are copolymerized in a second-stage reaction, and this type of method is described in, for example, Japanese Patent laid-open No. 3-97747, No. 3-205439, No. 4-153203, No. 4-261423, No. 5-93024, etc.

The melt flow rate (hereinafter referred to as, "MFR") of the thus obtained BPP as measured according to JIS K7210 at a temperature of 230° C. under a load of 2.16 kg is usually 50 g/10 minutes or below.

The organic peroxide (B) used according to the present invention is not restricted, but it is preferred that a decomposition rate thereof at a melting point of BPP is above 1 second at half-life and a decomposition rate at 300° C. is 10 minutes or below. Examples thereof include t-butyl hydroperoxide, dicumyl peroxide, 1,3-bis(t-butylperoxyisopropyl)benzene, benzoyl peroxide, methylisobutylketone peroxide, t-butyl perbenzoate, diisopropyl peroxydicarbonate, vinyl tris(t-butylperoxy) silane, etc. The mixing ratio of the organic peroxides is 0.005 to 2 parts by weight, and preferably 0.01 to 1.8 parts by weight per 100 parts by weight of BPP, and particularly suitably 0.02 to 1.5 parts by weight. When the mixing ratio is below 0.005 parts by weight, flowability is insufficient, whereas above 2 parts by weight problems such as coloring or surface stickiness of a molded article occur.

The MFR of the composition of the present invention may be adjusted by dynamic heat treatment of the blend of the above-mentioned components. As a method of heat treatment, a prior known melting and kneading method may be applied. Examples of such method include kneading methods using a mixer such as an open roll, a banbury mixer, a kneader, etc. or an extruder. The treatment temperature is generally 170° to 280° C., and preferably 190° to 260° C. It is necessary that MFR adjusted thus is in the range of 50 to 300 g/10 minutes and preferably in the range of from 60 to 270 g /10 minutes, and particularly suitably 70 to 250 g/10 minutes. When MFR is below 50 g/10 minutes, stampable moldability deteriorates, whereas above 300 g/10 minutes it is unpreferable since mechanical strength is insufficient.

The plasticizer (C) of the present invention is at least one selected from the group consisting of mineral oil softeners, phthalate plasticizers and silicone oils.

Mineral oil softeners, which are high-boiling-point petroleum fractions, include species of paraffinic type, naphthenic type and aromatic type, and are used as softeners during rubber processing. Among them, paraffin softeners are preferable.

Phthalate plasticizers are used as plasticizers for vinyl chloride resins, and examples thereof include dimethyl phthalate, diethyl phthalate, diisobutyl phthalate, dibutyl phthalate, diheptyl phthalate, di-n-octyl phthalate, di-2-ethylhexyl phthalate, diisooctyl phthalate, di-n-octyl phthalate, dinonyl phthalate, diisodecyl phthalate, ditridecyl phthalate, dicyclohexyl phthalate, butylbenzyl phthalate, butyllauryl phthalate, methyloleyl phthalate, etc. Among them, dimethyl phthalate, diethyl phthalate and diisobutyl phthalate are preferable.

Silicone oils are fluidized oily substances comprising mainly of linear diorganopolysiloxanes, and they are used as additives in hydraulic fluids, mold release agents, defoaming agents, paints, cosmetics, and the like. Examples thereof include dimethylpolysiloxane, monomethylpolysiloxane, methylphenylpolysiloxane, alkyl-modified silicone, amino-modified silicone, epoxy-modified silicone, carboxyl-modified silicone, mercapto-modified silicone, alkyl higher alcohol-modified silicone, alcohol-modified silicone, chloroalkyl-modified silicone, polyether-modified silicone, fluorine-modified silicone, etc. Among them, dimethylpolysiloxane, monomethylpolysiloxane and methylphenylpolysiloxane are preferable.

The content of component (C) per 100 parts by weight of BPP of the present invention is, in total, 1 to 30 parts by weight, and preferably 2 to 25 parts by weight and particularly suitably 3 to 20 parts by weight. When the content is above 30 parts by weight, it is unpreferable since it can result in bleed-out.

The rubbery polymer (D) being used in the present invention is not restricted, and examples thereof include natural rubber (NR); synthetic rubbers such as butadiene rubber (BR), isoprene rubber (IR), chloroprene rubber (CR), styrene-butadiene rubber (SBR), isobutene-isoprene rubber (IIR), acrylonitrile-butadiene rubber (NBR), ethylene-propylene copolymer rubber (EPR), ethylene-propylene-unconjugated diene copolymer rubber (EPDM), propylene-butene rubber, butyl rubber, silicone rubber, fluorosilicone rubber, nitrile rubber and epichlorohydrin rubber; and various thermoplastic elastomers including styrene elastomers such as styrene/isoprene-styrene block copolymer (SIS), styrene-ethylene/isoprene-styrene block copolymer (SEPS), styrene-butadiene-styrene block copolymer (SBS), styrene-ethylene/butylene-styrene block copolymer (SEBS), olefin elastomers and ester elastomers, and furthermore also polybutene and atactic polypropylene (APP) as low-molecular-weight rubbers; liquid rubbers such as liquid BR, liquid IR and liquid CR; chlorinated polyolefins such as chlorinated polyethylene, chlorinated ethylene-propylene copolymer rubber, etc., and polyethylene chlorosulfonate. Among them, EPR, EPDM, hydrogenated SBR, SEPS, etc. are preferably used. All of the rubbery polymers are marketed as articles in numerous grades, and according to the present invention the commercially available articles may be suitably used. Two or more thereof may also be used in a mixture.

The content of component (D) per 100 parts by weight of BPP of the present invention is 5 to 150 parts by weight, preferably 10 to 140 parts by weight, and particularly suitably 15 to 130 parts by weight. When the content of component (D) is above 150 parts by weight, it is unpreferable since mechanical strength deteriorates.

Among the compositions according to the present invention, those which do not contain component (C), i.e. those consisting of components (A) and (B) or of components (A), (B) and (D) need have a main endothermic peak temperature Tmp of 120° to 150° C. and a main exothermic peak temperature Tcp of 85° to 105° C. for crystallization temperature, as measured with a Differential Scanning Calorimetry (DSC), and a Tcp half-value width of 5° C. or above. The Tmp is preferably 125° to 148° C. and particularly suitably 130° to 145° C. When Tmp is below 120° C., both mechanical strength and heat resistance deteriorate, whereas above 150° C. stampable moldability deteriorate. Tcp is preferably 87° to 100° C. and particularly suitably 88° to 98° C. When Tcp is below 85° C., molding cycle is prolonged, whereas above 105° C. flexibility deteriorates. The Tcp half-value width is preferably 6° C. or above. When half-value width is below 5° C., it is unpreferable since stampable moldability deteriorates.

The method of measuring Tmp and Tcp using a Differential Scanning Calorimetry (DSC) involves determining a main exothermic peak temperature Tcp from an exothermic peak curve being obtained when a temperature of a sample is elevated to 230° C. to melt and then cooled to −30° C. at a temperature-lowering rate of 20° C./min, and the peak width at the 50% height of the peak is defined as a half-value width, followed by maintaining the temperature of −30° C. for 5 minutes and then elevating the temperature to 230° C. at a temperature-elevating rate of 20° C./min, thereby determining a main endothermic peak temperature Tmp from an endothermic peak curve being obtained thus.

The composition of the present invention is used not only alone, but also laminated on other materials.

Additives being conventionally utilized by those skilled in the art, for example, antioxidants, weathering stabilizers, antistatic agents, lubricants, blocking resistance agents, anticlouding agents, pigments, fillers and the like may also be appropriately incorporated in the composition of the present invention within the range wherein the object of the present invention is not hindered.

A multilayered laminate according to the present invention will now be explained.

Components (A) to (D) being used for layer I of the laminate of the present invention have been described above. Since in the laminate of the present invention "moistness" is provided for its surface touching particularly by incorporating component (C), it is particularly suitably used in the fields in which such touching is required. The method of incorporation may involve initially blending each of the above-mentioned components with component (C), or adding component (C) to a blend of the above-mentioned components which has been subjected to dynamic heat treatment. The latter method is preferred when component (D) is a rubber containing a double bond in the molecule, such as BR or IR.

The substrate being used for layer II as one of the layers according to the present invention is not restricted to any particular species, and may be appropriately selected from materials used by those skilled in the art, depending on the purpose to be used. Examples include other synthetic resins such as polypropylene, composite resins containing various fillers, as well as other composite materials, plywood, metals, gypsum, etc. It may also be used in various forms including films, plates, foams, honey-comb shapes and laminates. The laminate according to the present invention is not limited to 2 layers, and may be a 3-layer laminate with an additional intermediate layer such as a foam layer, in order to provide further flexibility.

Layer III consisting of foam as one of the layers according to the present invention may be any type of foam. Examples of foams which may be used include phenol resin foam, urea resin foam, epoxy resin foam, polyurethane resin foam, polystyrene resin foam, ABS foam, polyolefin foam including polyethylene, polypropylene, vinyl chloride resin foam, cellulose acetate foam, polyamide foam, polyimide foam, polyvinyl alcohol foam, saponified product of ethylene-vinyl acetate foam, acrylic resin foam, ionomer foam, vinylidene chloride foam, polyvinyl formal foam, and the like. Polyolefin resin foams are particularly preferred from the standpoint of impact resistance and adhesion to a surface layer. Further, when the adhesion between a surface layer and a foam layer is insufficient, a polyether, polyester or polyurethane adhesive may be laminated as an adhesive layer. The foams are commercially available and may be used depending on the purpose to be used. There may also be used foams obtained by foaming a resin(s) having properties along intended purpose with gaseous or liquid foaming agents, foams by foaming thereof with chemical foaming agents, foams by crosslinking thereof according to radiation-induced method, or crosslinked foams by introducing chemical crosslinking thereof.

The multilayered laminate of the present invention may be used not only alone, but also may be laminated on a substrate layer formed of a synthetic resin and the like, or be laminated on other sheets.

BEST MODE FOR CARRYING OUT THE INVENTION

Figure 1:
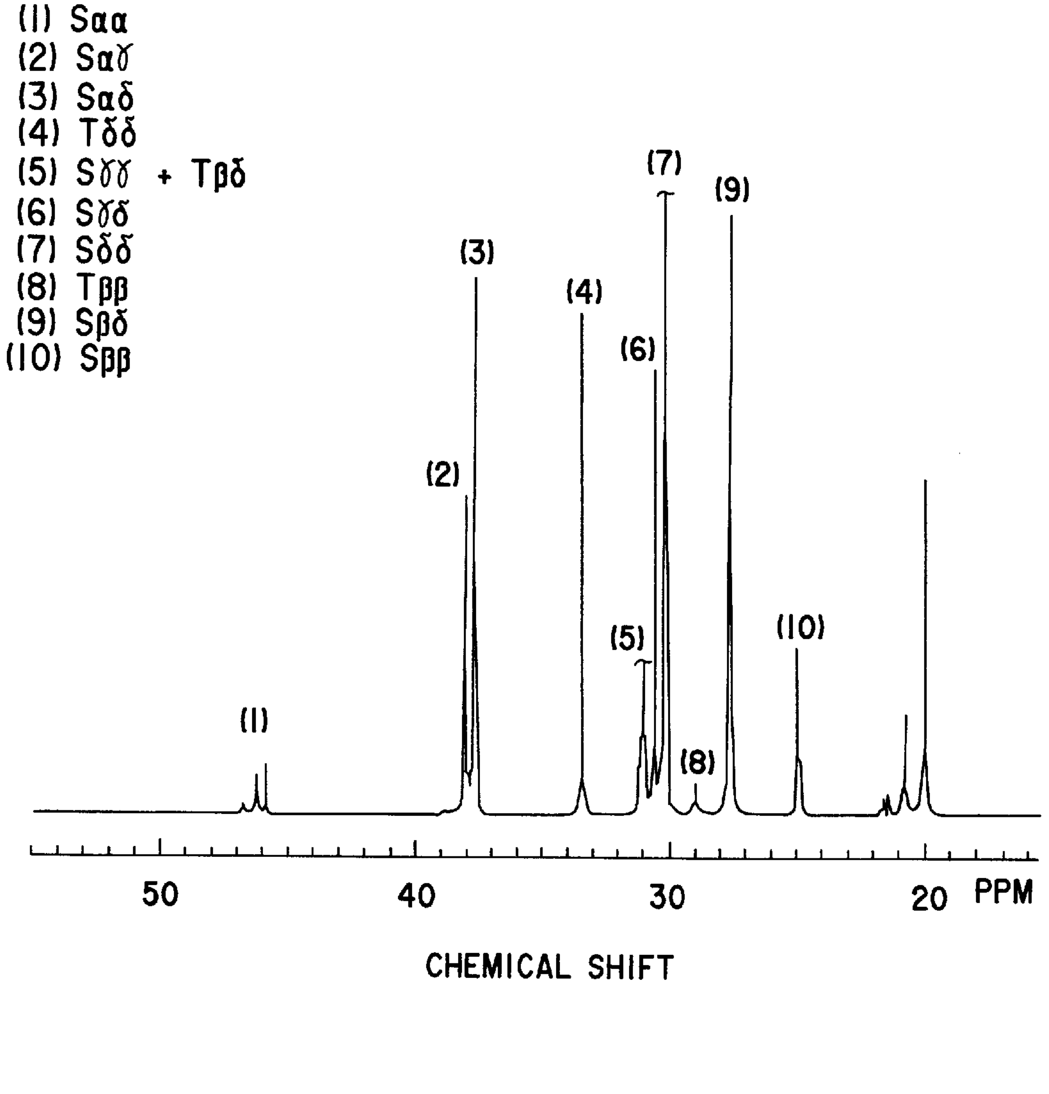
FIG. 1 shows a carbon isotope ($^{13}C$) nuclear magnetic resonance spectrum for ethylene-propylene copolymer.
Figure 2:
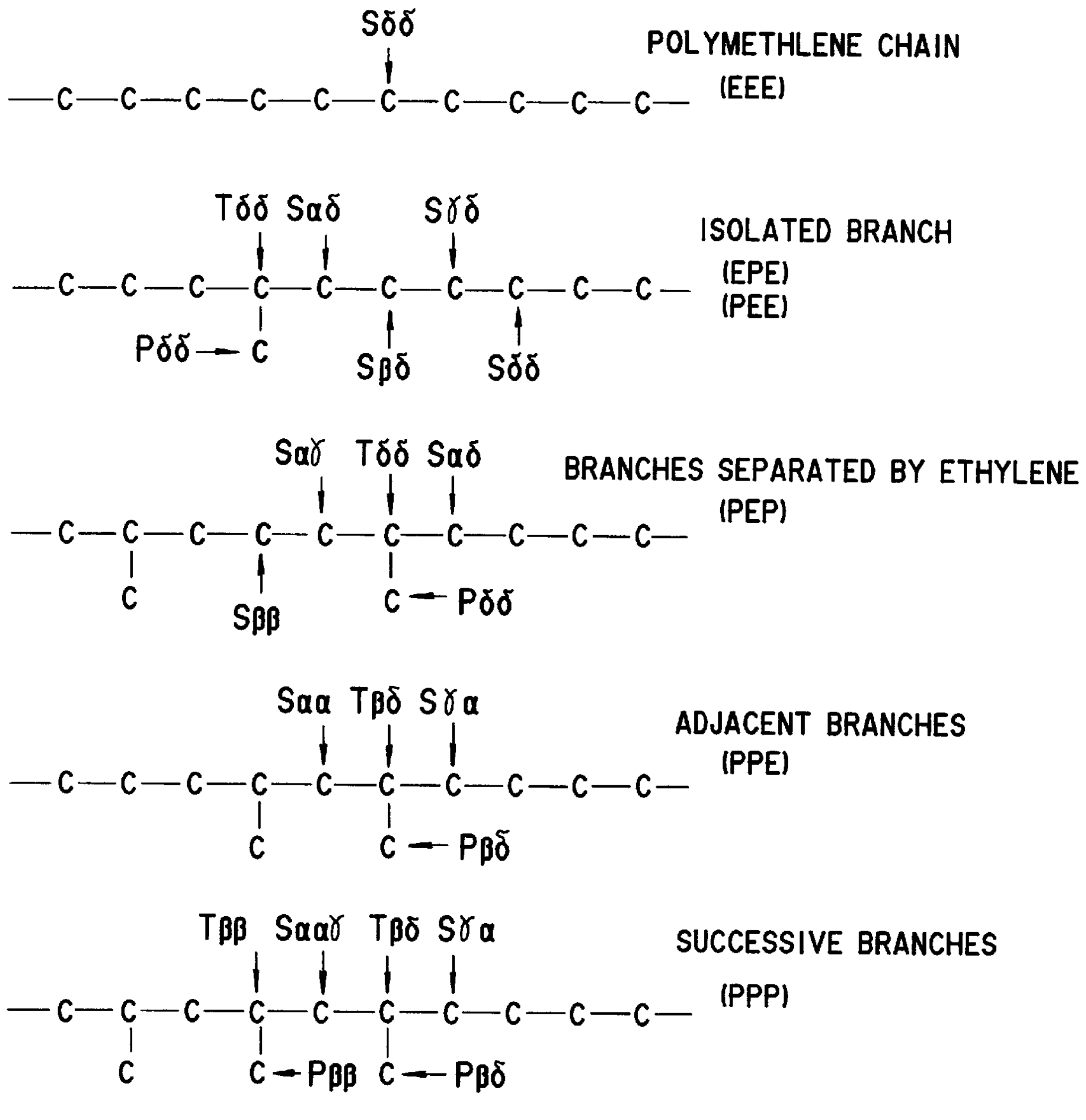
FIG. 2 is an illustration showing the name of the each carbon derived from chain distribution in a polyolefin.

The present invention will further be explained in detail by Examples.

The methods of measuring the properties were as follows.

[Analysis of p-xylene-soluble matter by 2-site model]

The $^{13}C$-NMR spectrum of the p-xylene-soluble matter was measured with the apparatus and under the measuring conditions shown below, and each of the signals was classified according to the method described in A. Zambelli, et al.; Macromolecules, 13, p.267(1980).

Apparatus: JNM-GSX400, made by Nihon Denshi K.k.
Measuring mode: Proton decoupling method
Pulse width: 8.0 $\mu$sec
Pulse repeating: 5.0 sec time
Total repeating: 20,000 times
Solvent: 1,2,4-trichlorobenzene/heavy benzene mixed solvent (75/25 vol %)
Internal: Hexamethyldisiloxane circulation
Sample: 300 mg/3.0 ml solvent concentration
Measuring: 120° C. temperature Then, 2-site model analysis was performed to determine FP, $P_P$ and $P_{f1}$.

[MFR]

Measurement was made according to JIS K7210 at a temperature of 230° C. under a load of 2.16 kg.

[Tmp, Tcp,and Tcp half-value width]

Apparatus: DSC measurement apparatus, made by of PERKIN-ELMER Co.
Sample: 3~5 mg
Measuring method: The same method as in above-mentioned

[Flowability]

Evaluation was made based on the following 3 criteria by visually observing a hot stamping molded article.

○: neither short shot nor thick section
Δ: some thick sections
X: many thick sections, short shots

[Sheet appearance]

Evaluation was made based on the following 4 criteria by visually observing a surface of a hot stamping molded article.

◎: very smooth
○: adequately smooth
Δ: no smoothness, having some wrinkle or pit patterns
X: no smoothness, having many wrinkle or pit patterns

[Tensile test]

Strength at break and elongation at break at a tensile velocity of 200 mm/min, according to JIS K6301 were measured using a No.3 dumbbell.

[Crystallization rate]

A sample was maintained to a temperature of 230° C. for 5 minutes with a Differential Scanning Calorimetry (made by PERKIN-ELMER Co.) and then lowered the temperature to 103° C. at a rate of 80° C./min, and a crystallization rate was expressed as a time (minutes) corresponding to ½ of a peak height of a crystallization curve being obtained when the temperature of 103° C. was maintained. Thus, a longer time indicates a smaller crystallization rate.

[Surface hardness]

Measurement was made with Shore A according to ASTM D2240.

[Peeling strength]

A laminate was cut into 25 mm-wide piece and measurement was made using a tensile strength tester (Model RTA-100, made by of Orientech Co.) at a tensile velocity of 50 mm/min.

[Embossing ability]

A embossing depth of a surface layer (layer I) ($R_1$) was measured using an Ohommel Tester Model T-1000, made by Ohommelwerke GmbH Co. according to JIS B0601, and a ratio ($R_1/R_2$) of $R_1$ to an embossing depth of mold ($R_2$) was expressed by % as an embossing transfer rate.

[Touching]

Touching was evaluated by lightly stroking a surface of layer I of a laminate with a finger, and was evaluated based on the following criteria.

1: moist resistance
2: middle between 1 and 3
3: smoothness with no resistance

[Hardness of laminate]

A hardness Hs (mm) of a laminate was measured by the test method 4.2 in Table 1 of JIS S6050.

[Components of resin composition]

(A) Propylene-α-olefin block copolymer

A block copolymer comprising a polypropylene block and an ethylene-propylene copolymer block was used. The types (BPP1 to 18) and properties (melt viscosity ratio, copolymer block proportion, p-xylene-insoluble matter and FP, $P_P$ and $P_{f1}$ of the p-xylene-soluble matter) are shown in Table 2.

(B) Organic peroxide 2,5-dimethyl-2,5-(t-butylperoxy)hexane was used.

(C) Plasticizer

"Hydrogenated process oil PW380" produced by Idemitsu Kousan Co. (hereinafter, referred to as, "OL1"), "butyl phthalate" produced by Kurogane Chemicals Co. (hereinafter, referred to as, "OL2") and "dimethylpolysiloxane SH200" produced by Toray-Silicone Co. (hereinafter, referred to as, "OL3") were used.

(D) Rubbery polymer

SEPS(Septon 2043, produced by Kurare Co.) of styrene elastomer (hereinafter referred to as, "ST"), APP (Santaattack L, produced by Chiba Fine Chemicals Co.) (hereinafter referred to as, "AP") and ethylene-propylene rubber (EP07, produced by Nihon Synthetic Rubber Co.) (hereinafter referred to as, "EP") were used.

[Substrate]

A 3.5 mm-thick polypropylene resin sheet (hereinafter referred to as, "PB") containing 20 wt % talc (average particle size: 5 μm) and a 3.5 mm-thick rigid polystyrene foam (hereinafter referred to as, "PS") were used.

EXAMPLES 1-1 to 1-7, COMPARATIVE EXAMPLES 1-1 to 1-2

The species and amount of each component shown in Table 3, and as additives, 0.1 parts by weight of pentaerythrityltetrakis [3-(3,5-di-t-butyl-4-hydroxyphenyl) propionate], 0.1 parts by weight of tris(2,4-di-t-butylphenyl) phosphite and 0.05 parts by weight of calcium stearate, were mixed by a super mixer (Model SMV20) manufactured by Kawada Works Co., and pelletized by a twin-screw extruder (Model KTX-37 manufactured by Kobe Steel Works Co.) at a cylinder temperature of 210° C. The MFR, Tmp and Tcp of each of the thus obtained pellets were measured.

Test pieces were prepared using an injection molding machine (IS-170FII manufactured by Toshiba Kikai Co.) from each of the thus obtained pellets and tensile tests were conducted.

Each of the pellets was stamping molded by extruding on a polypropylene resin substrate (thickness: 3.5 mm) with a hot stamping molding machine (FSM450 type manufactured by Takahashi Kogyo K.K.) under conditions of a die temperature of 220° C., a clamping pressure of 200 tons and a mold temperature of 70° C., to obtain containers (length: 600 mm, width: 800 mm, height: 5 mm, thickness: 3 mm). The flowability and surface appearance of each of the containers was evaluated visually. The results are shown in Table 3.

EXAMPLES 2-1 to 2-9, COMPARATIVE EXAMPLES 2-1 to 2-4

Pellets were prepared in the same manner as in Example 1-1 except that the species and amounts of components shown in Table 4 were used. The MFR and crystallization rates of the thus obtained pellets were measured.

Each of the pellets were stamping molded in the same manner as in Example 1-1 to obtain containers of the same size as in Example 1-1. The flowability and surface appearance of each of the containers were evaluated visually. The results are shown in Table 4.

EXAMPLES 3-1 to 3-8, COMPARATIVE EXAMPLES 3-1 to 3-2

Pellets were prepared in the same manner as in Example 1-1 except that the species and amounts of components shown in Table 5 were used. The MFR, Tmp and Tcp of the thus obtained pellets were measured.

Each of the pellets were stamping molded in the same manner as in Example 1-1 to obtain containers of the same size as in Example 1-1. The flowability and surface appearance of each of the containers were evaluated visually. The results are shown in Table 5.

EXAMPLE 3-9

BPP, an organic peroxide and the above-mentioned additive were pelletized in the same manner as in Example 1-1, in the species and amounts shown in Table 5. Then, a rubbery polymer was added thereto to blend with a tumbler and pellets were again prepared by the method described above. The MFR, Tmp and Tcp of the thus obtained pellets and the flowability and surface appearance of the molded article were evaluated. The results are shown in Table 5.

EXAMPLES 4-1 to 4-6, COMPARATIVE EXAMPLES 4-1 to 4-2

Pellets were prepared in the same manner as in Example 1-1 except that the species and amounts of components shown in Table 6 were used (hereinafter referred to as "method I").

The MFR, Tmp and Tcp of the obtained pellets were measured. Each of the pellets were stamping molded in the same manner as in Example 1-1 to obtain containers of the same size as in Example 1-1. The flowability and surface appearance of each of the containers were evaluated visually. The results are shown in Table 6.

EXAMPLES 4-7 to 4-9

Pellets were prepared and evaluated in the same manner as in Example 1-1 in the species and amounts shown in Table 6, except that dynamic heat treatment was carried out in advance for a blend of BPP, a rubber component and an organic peroxide component in Example 4-7, for a blend of BPP and a rubber component in Example 4-8 and for a blend of BPP, a rubber component and an organic peroxide component in Example 4-9 (hereinafter referred to as "method II", "method III" and "method IV", respectively). The results are shown in Table 6.

EXAMPLES 5-1 to 5-13, COMPARATIVE EXAMPLES 5-1 to 5-3

The species and amount of each component of layer I shown in Table 7, and as additives, 0.1 parts by weight of pentaerythrityltetrakis [3-(3,5-di-t-butyl-4-hydroxyphenyl) propionate], 0.1 parts by weight of tris(2,4-di-t-butylphenyl) phosphate and 0.05 parts by weight of calcium stearate, were mixed by a super mixer (Model SMV20) manufactured by Kawada Works Co., and pelletized by a twin-screw extruder (Model KTX-37 manufactured by Kobe Steel Works Co.) at a cylinder temperature of 210° C. The MFR of each of the thus obtained pellets was measured.

Each of the pellets was stamping molded by extruding on a substrate of layer II shown in Table 7 with a hot stamping molding machine (FSM450 type manufactured by Takahashi Kogyo K.K.) under conditions of a die temperature of 220° C., a clamping pressure of 200 tons and a mold temperature of 70° C., to obtain containers (length: 600 mm, width: 800 mm, height: 5 mm, thickness: 3 mm). The flowability and surface appearance of each of the containers was evaluated visually. Further, the peeling strength and embossing transfer rate were also measured. An embossed mold with 70 μm embossing depth was used on the side of layer I.

The results are shown in Table 8.

EXAMPLES 6-1 to 6-18, COMPARATIVE EXAMPLES 6-1 to 6-4

Pellets were prepared in the same manner as in Example 5-1 except that the species and amounts of components shown in Table 11 were used. Each of the pellets were stamping molded by extruding on a substrate of layer II shown in Table 9 in the same manner as in Example 5-1 to obtain containers of the same size as in Example 5-1. The flowability and surface appearance of each of the containers were evaluated visually. Further, the peeling strength and embossing transfer rate were also measured. An embossed mold with 70 μm embossing depth was used on the side of layer I.

The results are shown in Table 10.

EXAMPLES 7-1 to 7-13, COMPARATIVE EXAMPLES 7-1 to 7-5

Pellets were prepared in the same manner as in Example 5-1 except that the species and amounts of components shown in Table 11 were used. The MFR of each of the thus obtained pellets was measured.

The pellets were stamping molded by extruding on substrates in the same manner as in Example 5-1 to obtain containers of the same size as in Example 5-1. The flowability and surface appearance of each of the containers was evaluated visually, and the peeling strength and touching were also evaluated.

The results are shown in Table 12.

EXAMPLES 8-1 to 8-13, COMPARATIVE EXAMPLES 8-1 to 8-4

Pellets were prepared in the same manner as in Example 5-1 except that the species and amounts of components shown in Table 13 were used. The MFR of each of the thus obtained pellets was measured.

The pellets were stamping molded by extruding on foam sheets in the same manner as in Example 5-1 to obtain containers of the same size as in Example 5-1. The flowability and surface appearance of each of the containers was evaluated visually.

The results are shown in Table 14.

INDUSTRIAL APPLICABILITY

The resin composition of the present invention has excellent low-temperature flowability and stampable moldability, and satisfactory appearance and mechanical strength (particularly tensile elongation), and a multilayered laminate using the composition of the present invention has superior peeling strength and embossing ability, and thus is useful in fields of interior materials including automobile parts, electrical and electronic parts, ships, wheeled vehicles, buildings, and the like.

TABLE 1

| Signal | Probability equation of 2-site model |
|---|---|
| (1) Sαα | $P_p^2 \times P_{f1} + P'_p{}^2 \times (1 - P_{f1})$ |
| (2) Sαγ | $(-2P_p^3 + 2P_p^2) \times P_{f1} + (-2P'_p{}^3 + 2P'_p{}^2) \times (1 - P_{f1})$ |
| (3) Sαδ | $(2P_p^3 - 4P_p^2 + 2P_p) \times P_{f1} + (2P'_p{}^3 - 4P'_p{}^2 + 2P'_p) \times (1 - P_{f1})$ |
| (4) Tδδ | $(P_p^3 - 2P_p^2 + P_p) \times P_{f1} + (P'_p{}^3 - 2P'_p{}^2 + P'_p) \times (1 - P_{f1})$ |
| (5) Sγγ + Yβδ | $(P_p^4 - 4P_p^3 + 3P_p^2) \times P_{f1} + (P'_p{}^4 - 4P'_p{}^3 + 3P'_p{}^2) \times (1 - P_{f1})$ |
| (6) Sγδ | $(-2P_p^4 + 6P_p^3 - 6P_p^2 + 2P_p) \times P_{f1} + (-2P'_p{}^4 + 6P'_p{}^3 - 6P'_p{}^2 + 2P'_p) \times (1 - P_{f1})$ |
| (7) Sδδ | $(P_p^4 - 5P_p^3 + 9P_p^2 - 7P_p + 2) \times P_{f1}\ (P'_p{}^4 - 5P'_p{}^3 + 9P'_p{}^2 - 7P'_p + 2) \times (1 - P_{f1})$ |
| (8) Tββ | $P_p^3 \times P_{f1} + P'_p{}^3 \times (1 - P_{f1})$ |
| (9) Sβδ | $(2P_p^3 - 4P_p^2 + 2P_p) \times P_{f1} + (2P'_p{}^3 - 4P'_p{}^2 + 2P'_p) \times (1 - P_{f1})$ |
| (10) Sββ | $(-P_p^3 + P_p^2) \times P_{f1} + (-P'_p{}^3 + P'_p{}^2) \times (1 - P_{f1})$ |

TABLE 2

| Species of BPP | Melt viscosity ratio ($\eta_1/\eta_2$) | Copolymer rubber component (wt. %) | Paraxylene insoluble matter (wt. %) | Paraxylene soluble matter FP (mol %) | Paraxylene soluble matter $P_p$ (mol %) | Paraxylene soluble matter $P_{f1}$ (—) |
|---|---|---|---|---|---|---|
| BPP 1 | 5.3 | 63.0 | 41.0 | 75.3 | 84.1 | 0.77 |
| BPP 2 | 4.8 | 69.1 | 38.2 | 72.1 | 82.2 | 0.71 |
| BPP 3 | 5.9 | 58.3 | 43.6 | 73.8 | 78.2 | 0.82 |
| BPP 4 | 6.3 | 65.2 | 39.5 | 75.2 | 84.6 | 0.74 |
| BPP 5 | 5.6 | 58.6 | 40.2 | 61.8 | 68.6 | 0.56 |
| BPP 6 | 5.2 | 63.0 | 42.0 | 74.3 | 84.1 | 0.74 |
| BPP 7 | 5.0 | 69.1 | 38.2 | 72.1 | 82.1 | 0.70 |
| BPP 8 | 7.6 | 58.3 | 39.5 | 73.8 | 78.4 | 0.81 |
| BPP 9 | 6.4 | 65.2 | 43.8 | 75.2 | 84.1 | 0.79 |
| BPP 10 | 5.8 | 58.6 | 35.8 | 61.8 | 68.8 | 0.59 |
| (For comparison) | | | | | | |
| BPP 11 | 18.3 | 26.9 | 83.3 | 54.3 | 62.9 | 0.61 |
| BPP 12 | 23.6 | 15.4 | 88.6 | 55.2 | 62.1 | 0.75 |
| BPP 13 | 9.8 | 48.9 | 82.1 | 54.1 | 63.2 | 0.62 |
| BPP 14 | 12.2 | 36.3 | 85.3 | 45.6 | 54.1 | 0.54 |
| BPP 15 | 2.6 | 65.8 | 24.3 | 74.3 | 81.6 | 0.69 |
| BPP 16 | 15.8 | 54.6 | 36.4 | 70.1 | 80.6 | 0.68 |

TABLE 2-continued

| Species of BPP | Melt viscosity ratio ($\eta_1/\eta_2$) | Copolymer rubber component (wt. %) | Paraxylene insoluble matter (wt. %) | Paraxylene soluble matter FP (mol %) | $P_p$ (mol %) | $P_{f1}$ (—) |
|---|---|---|---|---|---|---|
| BPP 17 | 18.1 | 26.1 | 83.1 | 54.1 | 62.3 | 0.60 |
| BPP 18 | 23.5 | 15.7 | 87.9 | 56.0 | 62.6 | 0.77 |

TABLE 3

| Example and Comp. Ex. | Species of BPP | Organic peroxide amount (parts by weight) | MFR (g/10 min) | Tmp (°C.) | Tcp (°C.) | Tcp half-value width (°C.) | Tensile strength: Strength at break (kg/cm$^2$) | Tensile strength: Elongation at break (%) | Hot stamping: Flowability | Hot stamping: Appearance |
|---|---|---|---|---|---|---|---|---|---|---|
| Example 1-1 | BPP 1 | 0.26 | 83 | 138.8 | 94.6 | 9.1 | 58 | 750 | ◎ | ○ |
| Example 1-2 | " | 0.5 | 174 | 136.8 | 91.5 | 10.0 | 63 | 790 | ◎ | ◎ |
| Example 1-3 | " | 0.6 | 201 | 136.6 | 91.1 | 10.3 | 64 | 770 | ◎ | ◎ |
| Example 1-4 | BPP 2 | 0.32 | 104 | 138.9 | 89.9 | 8.7 | 54 | 780 | ◎ | ◎ |
| Example 1-5 | BPP 3 | 0.32 | 98 | 138.7 | 86.9 | 10.2 | 69 | 740 | ◎ | ◎ |
| Example 1-6 | BPP 4 | 0.3 | 91 | 137.2 | 93.3 | 9.4 | 57 | 770 | ◎ | ◎ |
| Example 1-7 | BPP 5 | 0.3 | 88 | 141.0 | 97.1 | 11.8 | 68 | 750 | ◎ | ◎ |
| Comp. Ex. 1-1 | BPP 11 | 0.26 | 81 | 148.2 | 102 | 4.8 | 140 | 230 | ○ | X |
| Comp. Ex. 1-2 | BPP 12 | 0.2 | 64 | 162.1 | 122 | 4.3 | 170 | 210 | X | Δ |

TABLE 4

| Example and Comp. Ex. | BPP Species | BPP Amount (parts by weight) | Plasticizer Species | Plasticizer Amount (parts by weight) | Organic peroxide amount (parts by weight) | MFR (g/10 min) | Crystallization rate (g/10 min) | Hot stamping: Flowability | Hot stamping: Appearance |
|---|---|---|---|---|---|---|---|---|---|
| Example 2-1 | BPP 1 | 90 | OL 1 | 10 | 0.24 | 72.4 | 1.9 | ○ | ◎ |
| Example 2-2 | BPP 2 | 95 | " | 5 | 0.26 | 78.1 | 1.3 | ○ | ◎ |
| Example 2-3 | " | 90 | " | 10 | 0.26 | 81.7 | 1.9 | ○ | ◎ |
| Example 2-4 | BPP 3 | 85 | OL 2 | 15 | 0.30 | 89.2 | 2.0 | ○ | ◎ |
| Example 2-5 | BPP 4 | 90 | OL 3 | 10 | 0.28 | 85.3 | 1.8 | ○ | ◎ |
| Example 2-6 | BPP 5 | 85 | OL 1 | 15 | 0.26 | 82.9 | 1.9 | ○ | ◎ |
| Example 2-7 | BPP 2 | 90 | " | 10 | 0.32 | 98.6 | 1.4 | ○ | ◎ |
| Example 2-8 | " | 90 | " | 10 | 0.43 | 126 | 1.2 | ○ | ◎ |
| Example 2-9 | BPP 1 | 90 | " | 10 | 0.60 | 198 | 1.0 | ○ | ◎ |
| Comp. Ex. 2-1 | BPP 13 | 90 | OL 1 | 10 | 0.26 | 76.2 | 1.2 | X | Δ |
| Comp. Ex. 2-2 | BPP 14 | 95 | " | 5 | 0.28 | 85.3 | 0.8 | Δ | Δ |
| Comp. Ex. 2-3 | BPP 15 | 85 | " | 15 | 0.30 | 92.4 | 0.9 | Δ | Δ |
| Comp. Ex. 2-4 | BPP 16 | 90 | OL 3 | 10 | 0.23 | 65.1 | 0.8 | X | X |

TABLE 5

| Example and Comp. Ex. | BPP Species | BPP Amount (parts by weight) | Rubbery polymer Species | Rubbery polymer Amount (parts by weight) | Organic peroxide amount (parts by weight) | MFR (g/10 min) | Tmp (°C.) | Tcp (°C.) | Tcp half-value width (°C.) | Surface hardness Shore A (—) | Hot stamping Flow-ability | Hot stamping Appear-ance |
|---|---|---|---|---|---|---|---|---|---|---|---|---|
| Example 3-1 | BPP 1 | 100 | ST | 10 | 0.20 | 53 | 139.0 | 87.5 | 10.2 | 82 | ○ | ◎ |
| Example 3-2 | BPP 2 | " | " | 20 | 0.26 | 82 | 138.9 | 87.1 | 10.6 | 79 | ○ | ◎ |
| Example 3-3 | " | " | " | 50 | 0.48 | 64 | 138.8 | 86.4 | 11.0 | 70 | ○ | ◎ |
| Example 3-4 | " | " | AP | 10 | 0.30 | 103 | 141.0 | 88.1 | 10.2 | 81 | ○ | ◎ |
| Example 3-5 | " | " | EP | " | 0.32 | 64 | 140.8 | 87.6 | 9.6 | 82 | ○ | ○ |
| Example 3-6 | BPP 3 | " | ST | " | 0.32 | 112 | 139.5 | 87.8 | 10.1 | 81 | ○ | ◎ |
| Example 3-7 | BPP 4 | " | " | 20 | 0.30 | 108 | 137.1 | 92.4 | 10.4 | 78 | ○ | ◎ |
| Example 3-8 | BPP 5 | " | AP | 10 | 0.50 | 178 | 140.6 | 88.0 | 10.3 | 80 | ○ | ◎ |
| Example 3-9 | BPP 2 | " | EP | " | 0.47 | 141 | 140.6 | 87.8 | 9.7 | 82 | ○ | ◎ |
| Comp. Ex. 3-1 | BPP 11 | 100 | ST | 20 | 0.26 | 82 | 148.1 | 101 | 4.8 | 85 | Δ | Δ |
| Comp. Ex. 3-2 | BPP 12 | " | AP | 10 | 0.10 | 19 | 161.7 | 122 | 4.7 | 100 or above | X | X |

Note:
(A) component and (D) component in Example 3-9 were subjected to heat treatment in advance.

TABLE 6

| Example and Comp. Ex. | Blending method | BPP Species | BPP Amount (parts by weight) | Rubbery polymer Species | Rubbery polymer Amount (parts by weight) | Plasticizer Species | Plasticizer Amount (parts by weight | Organic peroxide Amount (parts by weight) | MFR (g/10 min) | Crystal-li-zation rate (—) | Surface hard-ness Shore A (—) | Hot stamping Flow-ability | Hot stamping Appear-ance |
|---|---|---|---|---|---|---|---|---|---|---|---|---|---|
| Example 4-1 | I | BPP 1 | 100 | ST | 10 | OL 1 | 10 | 0.30 | 116 | 1.2 | 79 | ○ | ◎ |
| Example 4-2 | " | BPP 2 | " | " | 20 | " | 20 | 0.60 | 105 | 1.3 | 76 | ○ | ◎ |
| Example 4-3 | " | " | " | AP | 10 | OL 2 | 20 | 0.28 | 102 | 1.8 | " | ○ | ◎ |
| Example 4-4 | " | BPP 3 | " | EP | " | OL 3 | 10 | 0.40 | 72 | 2.2 | 75 | ○ | ○ |
| Example 4-5 | " | BPP 4 | " | ST | 50 | OL 1 | 5 | 0.47 | 72 | 1.5 | 71 | ○ | ◎ |
| Example 4-6 | " | BPP 5 | " | " | 10 | " | 10 | 0.30 | 115 | 1.2 | 81 | ○ | ◎ |
| Example 4-7 | II | BPP 2 | " | EP | " | " | " | 0.47 | 138 | 2.2 | 74 | ○ | ◎ |
| Example 4-8 | III | " | " | " | " | " | " | " | 136 | 2.1 | 75 | ○ | ◎ |
| Example 4-9 | IV | " | " | " | " | " | " | " | 133 | " | " | ○ | ◎ |
| Comp. Ex. 4-1 | I | BPP 11 | 100 | ST | 20 | — | — | 0.26 | 82 | 0.8 | 85 | ○ | X |
| Comp. Ex. 4-2 | " | BPP 12 | " | AP | 10 | OL 1 | 10 | 0.20 | 62 | 0.1 or below | 100 or above | Δ | Δ |

TABLE 7

| Example and Comp. Ex. | Layer I BPP Species | Layer I BPP Amount (parts by weight) | Layer I Organic peroxide amount (parts by weight) | Layer I Plasticizer Species | Layer I Plasticizer Amount (parts by weight) | Layer I MFR (g/10 min) | Layer II species |
|---|---|---|---|---|---|---|---|
| Example 5-1 | BPP 1 | 100 | 0.26 | — | — | 83 | PB |
| Example 5-2 | " | " | 0.50 | — | — | 174 | " |
| Example 5-3 | " | " | 0.60 | — | — | 201 | " |
| Example 5-4 | BPP 2 | " | 0.32 | — | — | 104 | " |
| Example 5-5 | BPP 3 | " | 0.32 | — | — | 98 | " |
| Example 5-6 | BPP 4 | " | 0.30 | — | — | 91 | " |
| Example 5-7 | BPP 5 | " | 0.30 | — | — | 88 | " |
| Example 5-8 | BPP 2 | " | 0.32 | — | — | 104 | PS |
| Example 5-9 | BPP 1 | 90 | 0.24 | OL 1 | 10 | 72 | PB |
| Example 5-10 | BPP 2 | 95 | 0.26 | " | 5 | 78 | " |
| Example 5-11 | BPP 3 | 85 | 0.30 | OL 2 | 15 | 89 | " |

TABLE 7-continued

| | Layer I | | | | | | |
|---|---|---|---|---|---|---|---|
| | BPP | | Organic peroxide | Plasticizer | | | |
| Example and Comp. Ex. | Species | Amount (parts by weight) | amount (parts by weight) | Species | Amount (parts by weight) | MFR (g/10 min) | Layer II species |
| Example 5-12 | BPP 4 | 90 | 0.28 | OL 3 | 10 | 85 | " |
| Example 5-13 | BPP 5 | 85 | 0.26 | OL 1 | 15 | 99 | " |
| Comp. Ex. 5-1 | BPP 11 | 100 | 0.26 | — | — | 81 | PB |
| Comp. Ex. 5-2 | BPP 12 | " | 0.20 | — | — | 64 | " |
| Comp. Ex. 5-3 | " | " | 0.20 | — | — | 64 | PS |

TABLE 8

| Example and Comp. Ex. | Hot stamping Flow-ability | Hot stamping Appear-ance | Embossing transfer rate (%) | Peeling strength (kg/ 25 mm) | Touching (—) |
|---|---|---|---|---|---|
| Example 5-1 | ◎ | ○ | 96 | 4.4 | 2 |
| Example 5-2 | ◎ | ◎ | 100 | 5 or above | " |
| Example 5-3 | ◎ | ◎ | " | " | " |
| Example 5-4 | ◎ | ◎ | 96 | " | " |
| Example 5-5 | ◎ | ◎ | " | " | " |
| Example 5-6 | ◎ | ◎ | " | 4.8 | " |
| Example 5-7 | ◎ | ◎ | " | " | " |
| Example 5-8 | ◎ | ◎ | " | 3.8 | " |
| Example 5-9 | ○ | ◎ | 92 | 3.9 | 1 |
| Example 5-10 | ○ | ◎ | 96 | 4.2 | 2 |
| Example 5-11 | ○ | ◎ | 90 | 3.6 | 1 |
| Example 5-12 | ○ | ◎ | 94 | 3.8 | " |
| Example 5-13 | ○ | ◎ | 90 | 3.5 | " |
| Comp. Ex. 5-1 | ○ | X | 67 | 2.8 | 2 |
| Comp. Ex. 5-2 | X | Δ | 50 | 2.5 | " |
| Comp. Ex. 5-3 | X | Δ | 50 | 1.2 | " |

TABLE 9

| | Layer I | | | | | | | | |
|---|---|---|---|---|---|---|---|---|---|
| | BPP | | Rubbery polymer | | Organic peroxide | Plasticizer | | | |
| Example and Comp. Ex. | Species | Amount (parts by weight) | Species | Amount (parts by weight) | amount (parts by weight) | Species | Amount (parts by weight) | MFR (g/ 10 min.) | Layer II Species |
| Example 6-1 | BPP 1 | 100 | ST | 10 | 0.20 | — | — | 53 | PB |
| Example 6-2 | BPP 2 | " | " | 20 | 0.26 | — | — | 82 | " |
| Example 6-3 | " | " | " | 50 | 0.48 | — | — | 64 | " |
| Example 6-4 | " | " | AP | 10 | 0.30 | — | — | 103 | " |
| Example 6-5 | " | " | EP | " | 0.32 | — | — | 64 | " |
| Example 6-6 | BPP 3 | " | ST | " | 0.32 | — | — | 112 | " |
| Example 6-7 | BPP 4 | " | " | 20 | 0.30 | — | — | 108 | " |
| Example 6-8 | BPP 5 | " | AP | 10 | 0.50 | — | — | 178 | " |
| Example 6-9 | BPP 2 | " | ST | 20 | 0.26 | — | — | 82 | PS |
| Example 6-10 | BPP 3 | " | " | 10 | 0.32 | — | — | 112 | " |
| Example 6-11 | BPP 2 | " | EP | " | 0.47 | — | — | 141 | PB |
| Example 6-12 | BPP 1 | " | ST | " | 0.30 | OL 1 | 10 | 116 | " |
| Example 6-13 | BPP 2 | " | " | 20 | 0.60 | OL 2 | 20 | 102 | " |
| Example 6-14 | BPP 3 | " | EP | 10 | 0.40 | OL 3 | 10 | 72 | " |
| Example 6-15 | BPP 4 | " | ST | 50 | 0.47 | OL 1 | 5 | 72 | " |
| Example 6-16 | BPP 5 | " | " | 10 | 0.30 | " | 10 | 115 | " |
| Example 6-17 | BPP 2 | " | " | 20 | 0.60 | " | 20 | 105 | PS |
| Example 6-18 | " | " | EP | 10 | " | " | 10 | 138 | " |
| Comp. Ex. 6-1 | BPP 11 | 100 | ST | 20 | 0.26 | — | — | 82 | PB |
| Comp. Ex. 6-2 | BPP 12 | " | AP | 10 | 0.10 | — | — | 19 | " |

TABLE 9-continued

| Example and Comp. Ex. | Layer I: BPP Species | BPP Amount (parts by weight) | Rubbery polymer Species | Rubbery polymer Amount (parts by weight) | Organic peroxide amount (parts by weight) | Plasticizer Species | Plasticizer Amount (parts by weight) | MFR (g/10 min.) | Layer II Species |
|---|---|---|---|---|---|---|---|---|---|
| Comp. Ex. 6-3 | " | " | " | " | " | — | — | 19 | PS |
| Comp. Ex. 6-4 | " | " | " | " | 0.20 | OL 1 | 10 | 38 | " |

TABLE 10

| Example and Comp. Ex. | Hot stamping: Flow-ability | Hot stamping: Appear-ance | Embossing transfer rate (%) | Peeling strength (kg/25 mm) | Touching (—) | Surface Hardness Shore A (—) |
|---|---|---|---|---|---|---|
| Example 6-1 | ○ | ◎ | 98 | 4.7 | 2 | 82 |
| Example 6-2 | ○ | ◎ | 100 | 5.0 or above | 2 | 79 |
| Example 6-3 | ○ | ◎ | 100 | " | 2 | 70 |
| Example 6-4 | ○ | ◎ | 96 | " | 2 | 81 |
| Example 6-5 | ○ | ○ | 100 | " | 2 | 82 |
| Example 6-6 | ○ | ◎ | 100 | " | 2 | 81 |
| Example 6-7 | ○ | ◎ | 100 | " | 2 | 78 |
| Example 6-8 | ○ | ◎ | 98 | 4.8 | 2 | 80 |
| Example 6-9 | ○ | ◎ | 98 | 4.2 | 2 | 79 |
| Example 6-10 | ○ | ◎ | 98 | 4.4 | 2 | 81 |
| Example 6-11 | ○ | ◎ | 98 | 5.0 or above | 2 | 82 |
| Example 6-12 | ○ | ◎ | 100 | 4.1 | 1 | 79 |
| Example 6-13 | ○ | ◎ | 100 | 3.1 | 1 | 76 |
| Example 6-14 | ○ | ○ | 100 | 3.9 | 1 | 75 |
| Example 6-15 | ○ | ◎ | 100 | 4.3 | 2 | 71 |
| Example 6-16 | ○ | ◎ | 100 | 3.8 | 1 | 81 |
| Example 6-17 | ○ | ◎ | 100 | 2.5 | 1 | 76 |
| Example 6-18 | ○ | ◎ | 100 | 2.6 | 1 | 74 |
| Comp. Ex. 6-1 | Δ | Δ | 76 | 2.9 | 2 | 85 |
| Comp. Ex. 6-2 | X | X | 56 | 2.7 | 3 | 100 or above |
| Comp. Ex. 6-3 | X | X | 56 | 1.5 | 3 | " |
| Comp. Ex. 6-4 | Δ | Δ | 59 | 1.0 | 3 | " |

TABLE 11

| Example and Comp. Ex. | Layer I: BPP Species | BPP Amount (parts by weight) | Organic peroxide amount (parts by weight) | Plasticizer Species | Plasticizer Amount (parts by weight) | MFR (g/10 min.) | Layer II Species |
|---|---|---|---|---|---|---|---|
| Example 7-1 | BPP 6 | 100 | 0.26 | — | — | 83 | PE[1)] |
| Example 7-2 | " | 100 | 0.70 | — | — | 174 | PP[2)] |
| Example 7-3 | " | 100 | 0.78 | — | — | 201 | PE |
| Example 7-4 | BPP 7 | 100 | 0.34 | — | — | 104 | PE |
| Example 7-5 | BPP 8 | 100 | 0.33 | — | — | 98 | PP |
| Example 7-6 | BPP 9 | 100 | 0.60 | — | — | 153 | PE |
| Example 7-7 | BPP 10 | 100 | 1.2 | — | — | 288 | PE |
| Example 7-8 | BPP 7 | 100 | 0.24 | — | — | 72 | PU[3)] |
| Example 7-9 | BPP 6 | 100 | 0.22 | — | — | 65 | PE |
| Example 7-10 | BPP 7 | 100 | 0.19 | OL 1 | 10 | 51 | PE |
| Example 7-11 | BPP 8 | 100 | 0.24 | OL 1 | 5 | 72 | PE |
| Example 7-12 | BPP 9 | 100 | 0.25 | OL 2 | 15 | 78 | PU |
| Example 7-13 | BPP 10 | 100 | 0.26 | OL 3 | 10 | 89 | PE |
| Comp. Ex. 7-1 | BPP 17 | 100 | 0.22 | — | — | 64 | PP |

TABLE 11-continued

| Example and Comp. Ex. | Layer I: BPP Species | Layer I: BPP Amount (parts by weight) | Layer I: Organic peroxide amount (parts by weight) | Layer I: Plasticizer Species | Layer I: Plasticizer Amount (parts by weight) | MFR (g/10 min.) | Layer II Species |
|---|---|---|---|---|---|---|---|
| Comp. Ex. 7-2 | BPP 18 | 100 | 0.22 | — | — | 67 | PE |
| Comp. Ex. 7-3 | " | 100 | 0.21 | OL 1 | 10 | 64 | PU |
| Comp. Ex. 7-4 | BPP 6 | 100 | 0.003 | OL 1 | 10 | 1 or below | PE |
| Comp. Ex. 7-5 | " | 100 | 2.5 | — | — | 500 or above | PE |

1)Polyethylene foam sheet (foaming magnification 5 times, 2 mm thick)
2)Polypropylene foam sheet (foaming magnification 10 times, 3 mm thick)
3)Polyurethane foam sheet (foaming magnification 5 times, 3 mm thick)

TABLE 12

| Example and Comp. Ex. | Hot stamping: Flowability | Hot stamping: Appearance | Peeling strength (Kg/25 mm) | Touching (—) | Hardness HS (mm) |
|---|---|---|---|---|---|
| Example 7-1 | ⊙ | ○ | 3.8 | 2 | 54.4 |
| Example 7-2 | ⊙ | ⊙ | M.B[1] | 2 | 53.3 |
| Example 7-3 | ⊙ | ⊙ | 4.1 | 2 | 52.8 |
| Example 7-4 | ⊙ | ⊙ | 4.0 | 2 | 54.1 |
| Example 7-5 | ⊙ | ⊙ | M.B[1] | 2 | 58.5 |
| Example 7-6 | ⊙ | ⊙ | 4.0 | 2 | 54.0 |
| Example 7-7 | ⊙ | ⊙ | 3.7 | 2 | 55.1 |
| Example 7-8 | ○ | ⊙ | 2.0 | 2 | 54.3 |
| Example 7-9 | ○ | ⊙ | 3.1 | 2 | 55.0 |
| Example 7-10 | ○ | ⊙ | 3.4 | 2 | 53.3 |
| Example 7-11 | ○ | ⊙ | 2.8 | 1 | 57.6 |

TABLE 12-continued

| Example and Comp. Ex. | Hot stamping: Flowability | Hot stamping: Appearance | Peeling strength (Kg/25 mm) | Touching (—) | Hardness HS (mm) |
|---|---|---|---|---|---|
| Example 7-12 | ○ | ⊙ | 1.8 | 1 | 53.1 |
| Example 7-13 | ○ | ⊙ | 2.7 | 2 | 54.2 |
| Comp. Ex. 7-1 | ○ | X | 1.8 | 2 | 81.9 |
| Comp. Ex. 7-2 | ○ | Δ | 1.5 | 2 | 93.3 |
| Comp. Ex. 7-3 | ○ | Δ | 0.6 | 2 | 90.6 |
| Comp. Ex. 7-4 | X | X | 3.8 | 3 | 60.5 |
| Comp. Ex. 7-5 | ⊙ | X | — | — | — |

1)M.B (Material Breakage): foam layer was broken in a peel strength of 5 Kg/25 mm or above.

In Comparative Example 7-5, it is impossible to measure since the surface layer is thin.

TABLE 13

| Example and Comp. Ex. | Layer I: BPP Species | Layer I: BPP Amount (parts by weight) | Layer I: Rubbery substance Species | Layer I: Rubbery substance Amount (parts by weight) | Layer I: Organic peroxide amount (parts by weight) | Layer I: Plasticizer Species | Layer I: Plasticizer Amount (parts by weight) | MFR (g/10 min) | Layer II Species |
|---|---|---|---|---|---|---|---|---|---|
| Example 8-1 | BPP 6 | 100 | ST | 10 | 0.30 | — | — | 65 | PE[1] |
| Example 8-2 | " | 100 | ST | 20 | 0.84 | — | — | 120 | PP[2] |
| Example 8-3 | " | 100 | ST | 50 | 0.94 | — | — | 100 | PP |
| Example 8-4 | BPP 7 | 100 | AP | 10 | 0.42 | — | — | 80 | PE |
| Example 8-5 | BPP 8 | 100 | EP | 10 | 0.39 | — | — | 74 | PE |
| Example 8-6 | BPP 9 | 100 | ST | 10 | 1.20 | — | — | 280 | PE |
| Example 8-7 | BPP 10 | 100 | ST | 20 | 1.00 | — | — | 200 | PE |
| Example 8-8 | BPP 7 | 100 | AP | 10 | 0.30 | — | — | 61 | PE |
| Example 8-9 | BPP 6 | 100 | ST | 10 | 0.28 | — | — | 55 | PU[3] |
| Example 8-10 | BPP 7 | 100 | ST | 10 | 0.20 | OL 1 | 10 | 54 | PE |
| Example 8-11 | BPP 8 | 100 | EP | 10 | 0.26 | OL 1 | 5 | 57 | PE |
| Example 8-12 | BPP 9 | 100 | ST | 7 | 0.23 | OL 2 | 15 | 72 | PE |
| Example 8-13 | BPP 10 | 100 | ST | 20 | 0.60 | OL 3 | 10 | 95 | PE |
| Comp. Ex. 8-1 | BPP 17 | 100 | EP | 20 | 0.28 | — | — | 30 | PU |
| Comp. Ex. 8-2 | BPP 18 | 100 | ST | 10 | 0.24 | — | — | 43 | PE |

TABLE 13-continued

| | Layer I | | | | | | | | |
|---|---|---|---|---|---|---|---|---|---|
| | BPP | | Rubbery substance | | Organic peroxide | Plasticizer | | | |
| Example and Comp. Ex. | Species | Amount (parts by weight) | Species | Amount (parts by weight) | amount (parts by weight) | Species | Amount (parts by weight) | MFR (g/10 min) | Layer II Species |
| Comp. Ex. 8-3 | " | 100 | ST | 10 | 0.23 | OL 1 | 10 | 40 | PE |
| Comp. Ex. 8-4 | BPP 6 | 100 | ST | 1 | 0.003 | OL 1 | 10 | 1 or below | PE |

[1)]Polyethylene foam sheet (foaming magnification 5 times, 2 mm thick)
[2)]Polypropylene foam sheet (foaming magnification 10 times, 3 mm thick)
[3)]Polyurethane foam sheet (Polyester, foaming magnification 5 times, 3 mm thick)

TABLE 14

| Example and Comp. Ex. | Hot stamping Flow-ability | Hot stamping Appear-ance | Peeling strength (Kg/25 mm) | Touching (—) | Hard-ness HS (mm) |
|---|---|---|---|---|---|
| Example 8-1 | ◎ | ○ | 3.8 | 2 | 53.4 |
| Example 8-2 | ◎ | ◎ | M.B.[1)] | 2 | 52.3 |
| Example 8-3 | ◎ | ◎ | M.B.[1)] | 2 | 51.8 |
| Example 8-4 | ◎ | ◎ | 4.0 | 2 | 53.1 |
| Example 8-5 | ◎ | ◎ | 4.4 | 2 | 57.5 |
| Example 8-6 | ◎ | ◎ | 4.0 | 2 | 53.0 |
| Example 8-7 | ◎ | ◎ | 3.7 | 2 | 54.1 |
| Example 8-8 | ○ | ◎ | 3.0 | 2 | 53.3 |
| Example 8-9 | ○ | ◎ | 2.5 | 2 | 54.0 |
| Example 8-10 | ○ | ◎ | 3.4 | 2 | 52.3 |
| Example 8-11 | ○ | ◎ | 2.8 | 1 | 56.6 |
| Example 8-12 | ○ | ◎ | 3.0 | 1 | 52.1 |
| Example 8-13 | ○ | ◎ | 2.7 | 2 | 53.2 |
| Comp. Ex. 8-1 | ○ | X | 0.9 | 2 | 58.0 |
| Comp. Ex. 8-2 | ○ | Δ | 1.5 | 2 | 90.2 |
| Comp. Ex. 8-3 | ○ | Δ | 1.2 | 2 | 88.5 |
| Comp. Ex. 8-4 | X | X | 3.8 | 3 | 59.5 |

[1)]M.B (Material Breakage): foam layer was broken in a peel strength of 5 Kg/25 mm or above.

We claim:

1. A propylene resin composition obtained by dynamic heat treatment of a blend of (A) 100 parts by weight of a propylene-α-olefin block copolymer wherein a ratio ($\eta_1/\eta_2$) of melt viscosity $\eta_1$ at a shear rate of $10^1$ $sec^{-1}$ to melt viscosity $\eta_2$ at a shear rate of $10^2$ $sec^{-1}$ is 3.5 to 8 as measured by a slit die method and (B) 0.005 to 2 parts by weight of an organic peroxide, and having a melt flow rate (measured according to JIS K7210, at a temperature of 230° C. under a load of 2.16 kg) adjusted to 50 to 300 g/10 minutes, a main endothermic peak temperature Tmp of 120° to 150° C. for melting temperature and a main exothermic peak temperature Tcp of 85° to 105° C. for crystallization temperature, as measured with a Differential Scanning Calorimetry, and a Tcp half-value width of 5° C. or above.

2. A propylene resin composition according to claim 1, wherein the component (A) comprises a polypropylene block and a copolymer block of propylene and an α-olefin of 2 to 12 carbon atoms (except 3), and a percent of the copolymer block to the total copolymer is 30 to 70% by weight.

3. A propylene resin composition according to claim 1, wherein the component (A) has the following properties (a) and (b):

(a) p-xylene-insoluble matter at 25° C. is 25 to 65% by weight, and (b) p-xylene-soluble matter at 25° C. has (i) an average propylene content (FP) of 20 to 80 mole % based on 2-site model, (ii) a propylene content ($P_P$) of 65 to 90 mole % in a copolymer ($P_H$) which is produced at an active point at which propylene preferentially is polymerized, based on the 2-site model, and (iii) a proportion ($P_{f1}$) of $P_H$ to the copolymer of 0.40 to 0.90.

4. A propylene resin composition obtained by dynamic heat treatment of a blend of (A) 100 parts by weight of a propylene-α-olefin block copolymer wherein a ratio ($\eta_1/\eta_2$) of melt viscosity $\eta_1$ at a shear rate of $10^1$ $sec^{-1}$ to melt viscosity $\eta_2$ at a shear rate of $10^2$ $sec^{-1}$ is 3.5 to 8 as measured by a slit die method, (B) 0.005 to 2 parts by weight of an organic peroxide, and (C) 1 to 30 parts by weight of at least one plasticizer selected from the group consisting of mineral oil softeners, phthalate plasticizers and silicone oils, and having a melt flow rate (measured according to JIS K7210, at a temperature of 230° C. under a load of 2.16 kg) adjusted to 50 to 300 g/10 minutes.

5. A propylene resin composition obtained by dynamic heat treatment of a blend of (A) 100 parts by weight of a propylene-α-olefin block copolymer wherein a ratio ($\eta_1/\eta_2$) of melt viscosity $\eta_1$ at a shear rate of $10^1$ $sec^{-1}$ to melt viscosity $\eta_2$ at a shear rate of $10^2$ $sec^{-1}$ is 3.5 to 8 as measured by a slit die method, (B) 0.005 to 2 parts by weight of an organic peroxide, and (D) 5 to 150 parts by weight of a rubbery polymer, and having a melt flow rate (measured according to JIS K7210, at a temperature of 230° C. under a load of 2.16 kg) adjusted to 50 to 300 g/10 minutes, a main endothermic peak temperature Tmp of 120° to 150° C. of a melting temperature and a main exothermic peak temperature Tcp of 85° to 105° C. for crystallization temperature, as measured with a Differential Scanning Calorimetry, and a Tcp half-value width of 5° C. or above.

6. A propylene resin composition comprising a mixture of a treated mixture obtained by dynamic heat treatment of a blend of 100 parts by weight of (A) 100 parts by weight of a propylene-α-olefin block copolymer wherein a ratio ($\eta_1/\eta_2$) of melt viscosity $\eta_1$ at a shear rate of $10^1$ $sec^{-1}$ to melt viscosity $\eta_2$ at a shear rate of $10^2$ $sec^{-1}$ is 3.5 to 8 as measured by a slit die method and (B) 0.005 to 2 parts by weight of an organic peroxide with (D) 5 to 150 parts by weight of a rubbery polymer, and having a melt flow rate (measured according to JIS K7210, at a temperature of 230° C. under a load of 2.16 kg) adjusted to 50 to 300 g/10 minutes, a main endothermic peak temperature Tmp of 120° to 150° C. for melting temperature and a main exothermic peak temperature Tcp of 85° to 105° C. for crystallization temperature, as measured with a Differential Scanning calorimetry, and a Tcp half-value width of 5° C. or above.

7. A propylene resin composition obtained from a blend of (A) 100 parts by weight of a propylene-α-olefin block copolymer wherein a ratio ($\eta_1/\eta_2$) of melt viscosity $\eta_1$ at a shear rate of $10^1$ $sec^{-1}$ to melt viscosity $\eta_2$ at a shear rate of $10^2$ $sec^{-1}$ is 3.5 to 8 as measured by a slit die method, (B) 0.005 to 2 parts by weight of an organic peroxide, (C) 1 to 30 parts by weight of at least one plasticizer selected from the group consisting of mineral oil softeners, phthalate plasticizers and silicone oils, and (D) 5 to 150 parts by weight of a rubbery polymer, wherein at least component (A) and component (B) among components (A) to (D) have been subjected to dynamic heat treatment in advance, and wherein at least components (C) or (D) are added to said components subject to heat treatment in advance if said components (C), (D) or both were not previously subjected to dymanic heat treatment, and having a melt flow rate (measured according to JIS K7210, at a temperature of 230° C. under a load of 2.16 kg) adjusted to 50 to 300 g/10 minutes.

8. A stamping molded article obtained by molding a propylene resin composition according to claim 1.

9. A stamping molded article obtained by molding a propylene resin composition according to claim 4.

10. A sheet molded article obtained by molding a propylene resin composition according to claim 5.

11. A sheet molded article obtained by molding a propylene resin composition comprising:

(A) 100 parts by weight of a propylene-α-olefin block copolymer wherein a ratio ($\eta_1/\eta_2$) of melt viscosity $\eta_1$ at a shear rate of $10^1$ $sec^{-1}$ to melt viscosity $\eta_2$ at a shear rate of $10^2$ $sec^{-1}$ is 3.5 to 8 as measured by a slit die method, (B) 0.005 to 2 parts by weight of an organic peroxide, (C) 1 to 30 parts by weight of at least one plasticizer selected from the group consisting of mineral oil softeners, phthalate plasticizers and silicone oils, and (D) 5 to 150 parts by weight of a rubbery polymer, wherein at least component (A) and component (B) among components (A) to (D) have been subjected to dynamic heat treatment in advance, and wherein at least components (C) or (D) are added to said components subject to heat treatment in advance if said components (C), (D) or both were not previously subjected to dymanic heat treatment, and having a melt flow rate (measured according to JIS K7210, at a temperature of 230° C. under a load of 2.16 kg) adjusted to 50 to 300 g/10 minutes.

12. A multilayered laminate which comprises at least two layers of a layer (I) being composed of a propylene resin composition obtained by dynamic heat treatment of a blend of (A) 100 parts by weight of a propylene-α-olefin block copolymer wherein a ratio ($\eta_1/\eta_2$) of melt viscosity $\eta_1$ at a shear rate of $10^1$ $sec^{-1}$ to melt viscosity $\eta_2$ at a shear rate of $10^2$ $sec^{-1}$ is 3.5 to 8 as measured by a slit die method, and (B) 0.005 to 2 parts by weight of an organic peroxide, and having a melt flow rate (measured according to JIS K7210, at a temperature of 230° C. under a load of 2.16 kg) adjusted to 50 to 300 g/10 minutes, and a substrate layer (II), or at least 2 layers of said layer (I) and a foam layer (III).

13. A multilayered laminate according to claim 12, wherein the component (A) comprises a polypropylene block and a copolymer block of propylene and an α-olefin of 2 to 12 carbon atoms (except 3), and a percent of the copolymer block to the total copolymer is 30 to 70% by weight.

14. A multilayered laminate according to claim 12, wherein the component (A) has the following properties (a) and (b):

(a) p-xylene-insoluble matter at 25° C. is 25 to 65% by weight and (b) p-xylene-soluble matter at 25° C. has (i) an average propylene content (FP) of 20 to 80 mole % based on 2-site model, (ii) a propylene content ($P_P$) of 65 to 90 mole % in a copolymer ($P_H$) which is produced at an active point at which propylene preferentially is polymerized, based on 2-site model, and (iii) a proportion ($P_{f1}$) of $P_H$ to the copolymer of 0.40 to 0.90.

15. A multilayered laminate which comprises at least 2 layers of a layer (I) made of a propylene resin composition obtained by dynamic heat treatment of a blend of (A) 100 parts by weight of a propylene-α-olefin block copolymer wherein a ratio ($\eta_1/\eta_2$) of melt viscosity $\eta_1$ at a shear rate of $10^1$ $sec^{-1}$ to melt viscosity $\eta_2$ at a shear rate of $10^2$ $sec^{-1}$ is 3.5 to 8 as measured by a slit die method, (B)0.005 to 2 parts by weight of an organic peroxide, and (C) 1 to 30 parts by weight of at least one plasticizer selected from the group consisting of mineral oil softeners, phthalate plasticizers and silicone oils, and having a melt flow rate adjusted to 50 to 300 g/10 minutes, and a substrate layer (II), or at least 2 layers of said layer (I) and a foam layer (III).

16. A multilayered laminate which comprises at least two layers of a layer (I) being composed of a propylene resin composition obtained by dynamic heat treatment of a blend of (A) 100 parts by weight of a propylene-α-olefin block copolymer wherein the ratio ($\eta_1/\eta_2$) of melt viscosity $\eta_1$ at a shear rate of $10^1$ $sec^{-1}$ to melt viscosity $\eta^2$ at a shear rate of $10^2$ $sec^{-1}$ is 3.5 to 8 as measured by a slit die method, and (B) 0.005 to 2 parts by weight of an organic peroxide, and (D) 5 to 150 parts by weight of a rubbery polymer, and having a melt flow rate (measured according to JIS K7210, at a temperature of 230° C. under a load of 2.16 kg) adjusted to 50 to 300 g/10 minutes, and a substrate layer (II), or at least 2 layers of the above-mentioned layer (I) and a foam layer (III).

17. A multilayered laminate which comprises at least two layers of a layer (I) being composed of a propylene resin composition obtained by dynamic heat treatment of a blend of (A) 100 parts by weight of a propylene-α-olefin block copolymer wherein a ratio ($\eta_1/\eta_2$) of melt viscosity $\eta_1$ at a shear rate of $10^1$ $sec^{-1}$ to melt viscosity $\eta_2$ at a shear rate of $10^2$ $sec^{-1}$ is 3.5 to 8 as measured by a slit die method, and (B) 0.005 to 2 parts by weight of an organic peroxide, and (C) 1 to 30 parts by weight of at least one plasticizer selected from the group consisting of mineral oil softeners, phthalate plasticizers and silicone oils and (D) 5 to 150 parts by weight of a rubbery polymer, and having a melt flow rate (measured according to JIS K7210, at a temperature of 230° C. under a load of 2,16 kg) adjusted to 50 to 300 g/10 minutes, and a substrate layer (II), or at least 2 layers of the above-mentioned layer (I) and a foam layer (III).

* * * * *

UNITED STATES PATENT AND TRADEMARK OFFICE
CERTIFICATE OF CORRECTION

PATENT NO.: 5,824,759
DATED : Oct. 20, 1998
INVENTOR(S) : Watanabe et al.
:

It is certified that error appears in the above-identified patent and that said Letters Patent is hereby corrected as shown below:

On the title page, under References Cited, item [56], insert the following:

FOREIGN PATENT DOCUMENTS

| | | DOCUMENT NUMBER | | | | | | | PUBLICATION DATE | COUNTRY OR PATENT OFFICE | CLASS | SUBCLASS | TRANSLATION YES | TRANSLATION NO |
|---|---|---|---|---|---|---|---|---|---|---|---|---|---|---|
| | | DE | 34 | 01 | 612 | A | | | 7/26/84 | Germany | | | | |
| | | EP | 0 | 208 | 330 | A | | | 1/14/87 | EPO | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |

Signed and Sealed this

Thirty-first Day of August, 1999

*Attest:*

Q. TODD DICKINSON

*Attesting Officer*

*Acting Commissioner of Patents and Trademarks*